May 5, 1942.   R. P. NEWHALL   2,281,790
LUMINOUS DISPLAY APPARATUS
Filed March 11, 1940   2 Sheets-Sheet 1

INVENTOR.
Ralph P. Newhall
BY Everett E. Kent
ATTORNEY.

May 5, 1942.  R. P. NEWHALL  2,281,790
LUMINOUS DISPLAY APPARATUS
Filed March 11, 1940  2 Sheets-Sheet 2

INVENTOR.
Ralph P. Newhall
BY Everett C. Kent
ATTORNEY.

Patented May 5, 1942

2,281,790

UNITED STATES PATENT OFFICE 2,281,790

LUMINOUS DISPLAY APPARATUS

Ralph P. Newhall, Conway, N. H., assignor to Kalorotor, Incorporated, New York, N. Y., a corporation of Delaware Application March 11, 1940, Serial No. 323,403

24 Claims. (Cl. 240—10.1)

This invention relates to improvements in luminous display apparatus.

More especially it relates to apparatus which produces interesting patterns in colors within a display portion of the apparatus.

The color effects emanate from lamps of various colors, moving continuously through the display area without being separately distinguishable. This may be by the travel of a succession of glass tubes, each made luminous in a distinctive color by electrical discharges through its contained neon or other gas, the color being determined by the nature of its gas or by the color of its glass, or by both. Such tubes require at their terminals high voltages of electricity, and these are conveniently obtained from any available alternating or interrupted current by stepping it up enough to serve the requirements of the particular lamps which are to be used. The electric discharge through the tube occurs if and while the voltage is high enough. In the case of an alternating current the discharge period includes ordinarily the crest and the depth of each wave, positive and negative; and it ceases as the alternating voltage approaches zero in each direction; so that, in case of a 60 cycle current the light fills the tube 120 times per second, with 120 dark intervals intervening. To human eyes such a light appears continuous; and if such a lamp moves sidewise its line of light generates an area, wherein the appearance of light persists for a time. If a lamp giving out different color moves into that area while the light of the first tube persists there, the effect in the human eye is a mixture of those two colors, different from each of them, in the region where the second area overlaps the first. The making of such color areas, and mixtures of colors, is conveniently accomplished by arranging tubes of gases, which give different colors during flow of electric current, in positions extending outward from a rotating shaft, to which they are fixed at suitable angular distances apart, so that in revolving about the axis they sweep sidewise through a circular orbit, preferably in a plane perpendicular to the shaft. Upon rotating the shaft by any convenient means an area of colored light trails after each tube.

Such lamps may be variously arranged, but if, for illustration, they are straight tubes which extend radially, the trail of light left by each will be in the form of a sector. The extent to which each lamp mixes its color with the color of the lamp next preceding it will depend upon the distance to which it enters the area where the visual effect of the preceding lamp is persisting, and this will be a function of the speed of rotation as well as a function of the angular distance between the two lamps. At a speed sufficiently slow there will be no mixing of colors, and a dark space may be open between the light sectors made by the two lamps. But if the apparatus is built and operated so that the visual effect from each lamp overlaps that from the lamp which precedes it, a disk-like continuity of color sectors results; except that by using speeds suited to give stroboscopic effects the intervals attending zero voltages may appear as dark sectors. Apparatus embodying the above principles is already known.

It has been proposed to operate such a motor at changing speeds, so that the angular spread and the overlap of the sectors of color change in a predetermined cycle. But when patterns are thus repeated in a fixed cycle the interest of people in the display quickly ends.

The present invention provides means for making color patterns, within a disk-like continuity, as above described, that have qualities, shapes and styles of change which are believed not heretofore attained. The patterns may be continually and pleasingly changing, without repetition in a recognizable cycle, if indeed there be any cycle at all. The apparatus can be set so that the color areas, or some of them, may become sub-divided into striae; or so that their hues are temporarily brilliant, or dull; or so that the hues are sub-divided into sundry shapes quite diverse from the sector-shapes above mentioned; and so that these shapes may seem to move forward or backward, outward, inward or spirally. Also the colors may be displayed in concentric rings; and the rings may appear stationary, or appear to be generated at the centre, and to move outward to the periphery; and the reverse. Meanwhile the tubes remain continuously connected to their source of energy, and their rotation does not stop even when it appears to do so, or when their light temporarily appears extinguished, or approximately so, or during the darkening of all but an eccentric lobe. Some of these changes may be self generating while the setting of the apparatus for rotation and lighting continue unchanged; others are produced by changing the setting of the apparatus in a particular way; and there may be a control instrument, remote from the display, by which an operator can change the type of display at will.

The unpredictability of the variations which will occur is a feature in holding attention of the beholder; and this is important both for its utility in advertising as well as for giving aesthetic pleasure in colors, these being two primary fields of utility of the new constructions herein disclosed.

For advertising, the improvements make the display apparatus operate with a diversity of color patterns in such beautiful and unpredictable variety and order that the attention of beholders is held for long periods of time; and the advertising message can be combined so as to be visible continuously or intermittently in the background of the color display; or beside it; the advertising display being operative without cessation of the rotative color display, if so preferred; or alternatively with the color, which can stop and start instantaneously, while mechanical rotation continues without obscuring the message.

The control means is an organization of electric wires and switches by which the operator can play the display as a color instrument, somewhat as one can play a musical instrument, the controls being for individual elements whose effects interact to make the display. By connecting a condenser, shunted across the lamps, solid hues in the display are converted into striae. By applying the condenser to one hue only, the place, area and character of color mix are changed. Introducing a pre-arranged reactance in the primary circuit of the transformer by which the tubes are lighted, or changing the number of convolutions in the primary of the transformer, varies the brilliance. By either of these devices, a reducing of applied voltage to a level where the action of one of the tubes is uncertain and flickering will throw a pronounced vitality of action into the display. An apertured mask, which may be rotated at a differential speed by the same power which revolves the lamps, contributes changes of another sort. At any given instant such a mask is eliminating one or another hue from unmixed vision, or from a mixture, or is eliminating such from one part of the field while letting that hue be seen in another part of the field, or is moving it about, or, at times, may exclude all. The devices for producing and controlling the differential between speed of lamps and speed of apertures are elements which may give to the display an appearance of slow rotatory movement, sometimes in one direction and sometimes in the other, to which the mask can add an aspect of going both ways at once, and of color masses moving about. Also, the mask can provide an occasional combining of hues whose lamp positions are not mutually adjoining. Although each particular mask has a particular cycle of effects relative to each particular arrangement of lamps, according to the shape, location and arrangement of its apertures relative to the lamps, the other pattern-changing elements introduce other variables into the display, so that, by the cooperation of all, the apparatus can run continuously for a long time producing patterns that seem to be non-repetitious, or, if similar, then at least with interesting variations of hue. Apertures in masks may be infinitely varied in design, but certain different types have been found to have distinctive effects, so that with different masks the display differs according to which mask is on, such as to make the said aspect of simultaneous diverse rotation; or to produce peripherally the birth of a color mass which then moves inward through the pattern toward the centre; or the reverse; moving spirally or radially; or to cause the cessation of all or nearly all light notwithstanding that the rotation and the lighting of the lamps are continuing unchanged. These are merely illustrative instances among many various features which may succeed each other in the display of a single type of patterns; and the invention provides a controlling means by which an unskilled person can change from type to type. By such changes the apparatus holds attention of persons, and so is useful to hold patrons in a resort, by being set with the type of display different on different days, or in successive hours; or being changed from moment to moment, by remote control.

Specific structures are described hereinafter, by whose combination and operation these and other new results and advantages can be attained.

These provide mechanical and electrical coaction to produce a continuity of changing patterns whose mystery, fascination and beauty both afford pleasure and hold attention. The mechanism as a whole is an article for profitable manufacture and sale in industry and commerce, for lovers of beauty, at home and in public places, and for advertisers to project their messages by display in conjunction with the said luminous display.

A feature which contributes prominently to these results is the aspect of continuous change, from one beautiful form to another, particularly in cases where the apparatus is arranged for the changes to occur without it being easily discernible whether any particular pattern is ever repeated.

The apparatus and its principles can be explained in the present specification by reference to a simple construction. It is to be understood however that the invention can be embodied in many ways other than that chosen for illustrative description.

It is intended that the patent shall cover, by suitable expression in the appended claims, whatever features of patentable novelty exist in the invention disclosed.

Figure 5:
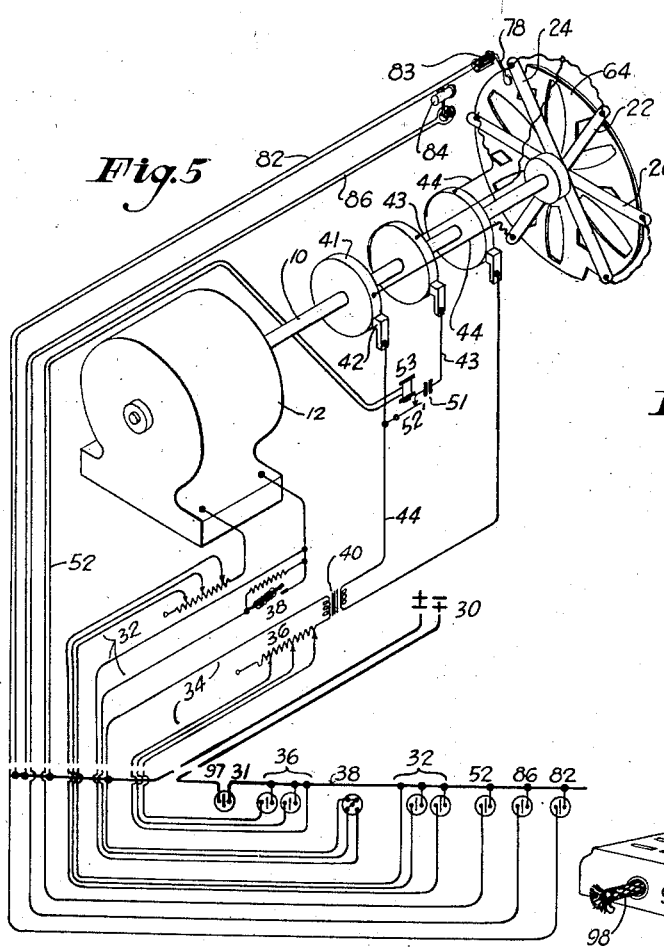
Figure 5 is a perspective diagram of electrical connections by which the display can be operated.
Figure 11:
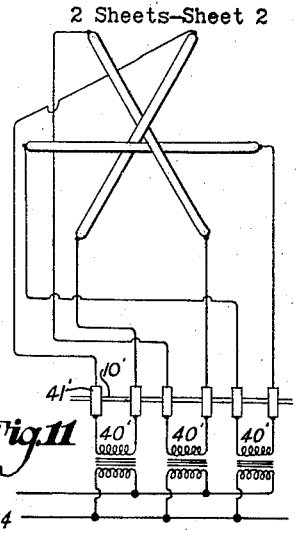
Figure 10:
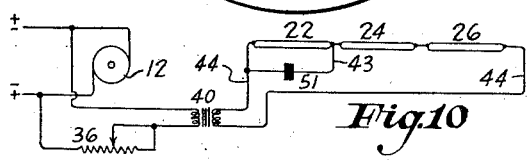

Figure 10 is a plane diagram of certain electrical features which appear in perspective in Figure 5, the crossed rotating arrangement of lamps being made rectilinear for clarity of showing connections, with a single transformer and lamps in series; and Figure 11 is a fragmentary diagram of transformer connections if the lamps of Figure 5 were made independent of each other by being arranged in parallel.

Figure 1:
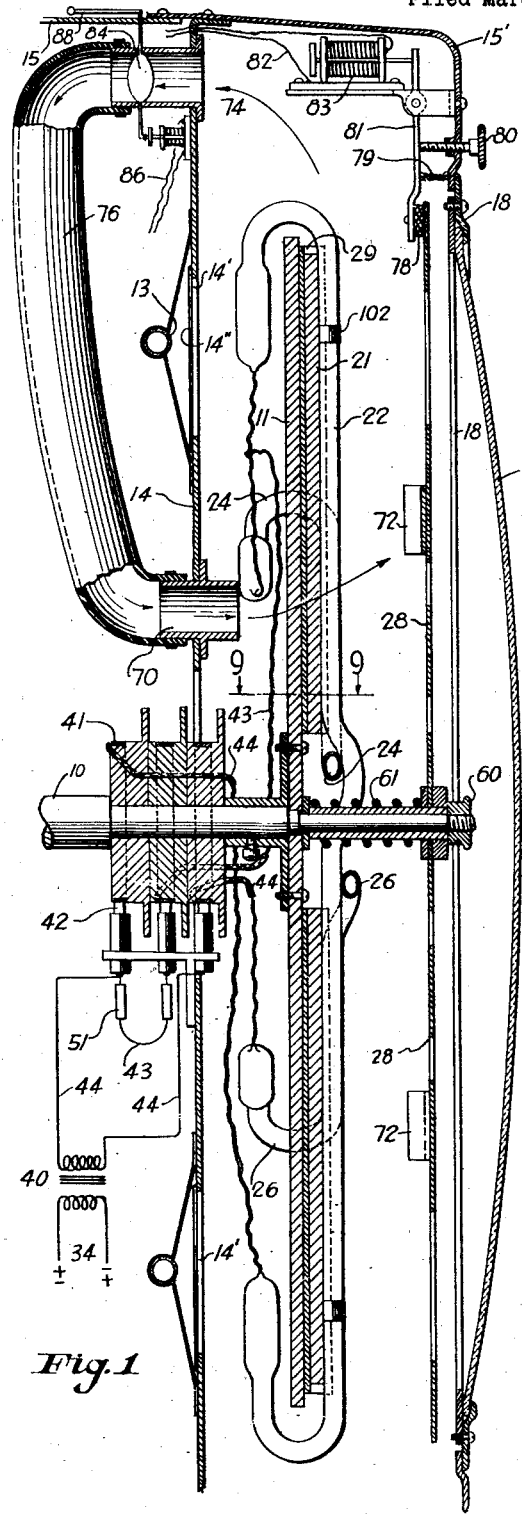
Figure 1 is a side view, being a section on 1—1 of Figure 2, partly diagrammatic, through the rotating parts which produce the display, in one form of apparatus embodying the invention.

In the particular embodiment of the invention illustrated in the drawings, a shaft 10, mounted and rotated by any suitable means, as by an electric motor 12 (Figure 5), extends through an opaque screen 14, which as represented in Figure 1 may be the front wall of a wooden or metal case whose remaining walls, indicated at 15, enclose the motor and subsidiary electrical apparatus. At a distance in front of wall 14 there may be a support 15' for a round bezel frame 18 for holding the edges of a large round glass cover 20 through which the display is to be seen, this frame and glass closure being openable by any means, as on hinges (not shown).

Figure 2:
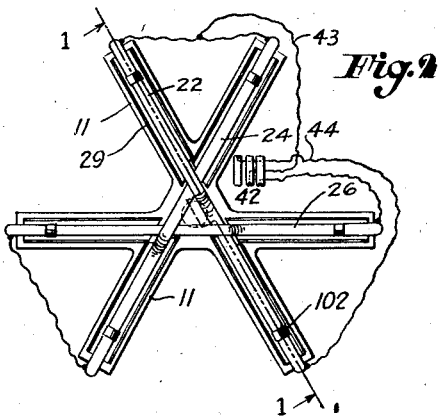
Figure 2 is a face view, somewhat in diagram, showing the lamp spider and the relative positions and connections of the three colored lamps in the apparatus of Figure 1.

Between the wall 14 and the glass cover 20 the shaft carries on a spider 11 the lamps 22, 24, 26, of whatever colors may be chosen, for example of red, blue and green. In the form here illustrated these are three straight neon tubes each crossing the others close beside the shaft, making angles of 60° with each other. For brevity the term "neon" tube is herein used in its popular comprehensive sense as referring to tubes of the neon type, i. e., gas tubes which become luminous when transmitting a curent of electricity, although the gaseous matter contained is other than neon. Such a tube operates without appreciable lag in becoming luminous, or becoming dark, upon receiving or losing at its terminals voltage sufficient to operate it. The color emanated is a characteristic of the gas, or of the glass through which the emanation passes out, or both. The tubular lamps may be in such lines or forms and be set around the axis, and at such angles to each other, in such arrangement as may be desired, the arrangement not being necessarily confined to the simple almost radial structure which is illustrated. If the tubes were set in exactly diametrical positions they would cross each other three deep over the end of the shaft. A structural and operative improvement over that is had by making each a chord passing at a little distance from the centre, as seen in Figure 2. Thus each tube crosses the other two tubes singly, with only a shallow bulge; the end of the shaft 10 is left uncovered by tubes. And thus a structural advantage is attained for another feature of the invention, viz, for a person to change the type of pattern, by the convenient mounting and demounting of the apertured masks 28. Also, considering the two ends of any one of the lamps, a diversity arises between their lengths of trail area of color generated before the next succeeding lamp interferes.

For commercial uses the opaque background screen 14 may carry an advertising message, painted or otherwise fixed upon it, within the area which is covered by the display rotation of the tubes. Preferably, however, for commercial uses, this screen is made of thin, stiff sheet stock, as metal or cardboard, as indicated in Figure 1, and it may be mounted removably in the case 15 for easy substitution of a similar board carrying a different message. The use of thin sheet stock facilitates the making of the message by letters cut through this wall as at 14', covered with a translucent sheet 14" which at proper times is illuminated from within the casing, as by a gaseous discharge lamp 13 set behind, so that, when this lamp 13 is luminous, the advertising message appears in letters of light. Such a lighted message is never concealed either during the display made in front of it by the lighted color tubes 22, 24, 26, or while they are rotating but not lighted. Even when merely painted, indeed, the message on the back can be made so as to be seen through the display.

Figure 3:
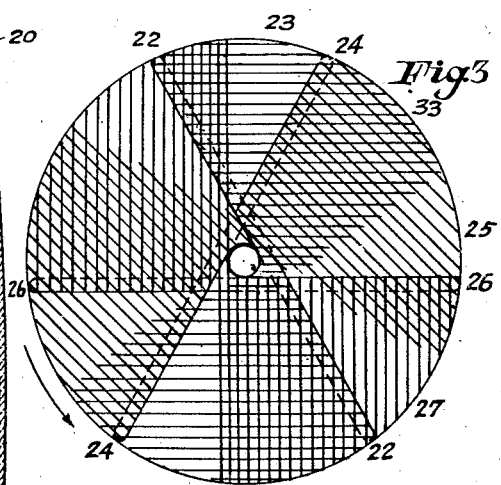
Figure 3 represents an appearance of colors, akin to that which the apparatus manipulates to make its various displays, being a disk-like continuity of color sectors made, without benefit of various features of the present invention, by a whirling of lamp tubes set on chords crossing the central region nearly diametrically.

When the lighted lamps 22, 24, 26 are whirled around the axis by the shaft 10 at a suitable speed a pattern of the general type indicated in Figure 3 is produced, showing areas of differing colors. Each lamp, when still, appears as a continuous line of light. Its whirling sidewise makes an area of light 23, 25, 27. If the lamps move fast enough areas made by adjoining lamps overlap so that for example a different color 33 results by mixture of 23 and 25 in the overlap area. If each lamp is set exactly across the centre of rotation the pure trailing colors 23, 25 and 27 and the mixed colors 33, 35, 37 will be sectors. In the apparatus illustrated, wherein the lamps are tubes set beside the shaft, instead of diametrically across it, the whirling produces peripheral areas in which the overlap area of each same two colors is different on opposite sides of the shaft. Figure 3 is a diagrammatic representation of one of the numerous effects, this being drawn on the assumption that tubes set as in Figure 2 rotate at such a speed that the trail of light of each lingers through 90° of rotation. The dotted lines indicate the tube positions at the instant portrayed.

If the number of flashes of the alternating current per second is an exact multiple of the number of revolutions per second, and the tubes are equally spaced around the axis, dark intervals between lamp flashes will be mutually superimposed, and by stroboscopic effect will appear to be standing still; and they will appear to be of that number by which the number of revolutions per second would have to be multiplied if it were to equal the number of flashes per second. If the flashes are not exactly a multiple of the revolutions, the darks will by stroboscopic effect appear to move forward or backward at a slow speed which depends upon whether the dark intervals successively occur a little beyond or a little before the position where the last dark occurred.

Assuming that the cycles of alternating current remain of uniform frequency it is already known that an appearance of slow movement can be attained by setting the speed of revolution of the lamps so that frequency of cycles per unit of time is near to being, but is not exactly, a multiple of the revolutions in the same time.

Additional apparatus now to be described changes the character, shapes and quality of the color areas, and may also introduce the characteristic of unpredictability.

The electric motor 12 may be a self-starting induction motor driven by circuit 32 from a source 30 (Fig. 5) of alternating electromotive force, having a master switch 31. For conveniently operating the lamps from the same source 30 a circuit 34 leads to one or more transformers 40, for raising the electromotive force to that required for luminous discharge tubes, which is in the thousands of volts, depending on the particular contents and size of each tube 22, 24, 26 and the number of tubes in series, as is well known. When the tubes are connected in series as in Figures 1-5, a single transformer can serve for all.

By arranging a condenser in a shunt across the series, and whirling the lamps sidewise, the color areas become split into striae, and the time of initiating discharge through those tubes in each cycle is affected. A desirable effect is had when the condenser is connected across only one of the group of tubes, at 51, Figure 5. The striae result from the number and higher frequency of the condenser discharge oscillations. An augmented voltage is thus applied in generating one of the colors. The condenser discharges through its particular tube, in this case tube 22, while that tube is already involved in a single regular discharge. Also the time of the initiating of the regular discharge is altered by the condenser, within the allotted space of 1/120 second, for example, and this gives a changed effect in the mixture with light of adjoining lamps; and all this makes a different type pattern of hues.

By reducing the voltage applied to the neon tubes to the level where they flicker, a different type of changing of patterns results; and another is had by raising the voltage to high brilliancy of the tubes. Alternative connections for choosing one of these are indicated by the three arrows at the reactance 36 in circuit 34, which may be rheostat or inductance, and can be pre-set at points to produce the particular pertinent voltages. By moving one or none of the switches 36 (lower part of Figure 5, Figure 6) the operator, or any suitable automatic switch operating means, can establish a selected one of these voltages in the primary circuit of the transformer; or if taps were provided out from the primary winding of the transformer the same effect could be had by similarly shifting from one to another. If the getting of a desired effect is hampered by the lamps being in series, considering that their several operating voltages may be different, they can be arranged in parallel with a separate transformer 40' and slip rings 41' on motor shaft 10', permitting individual control thereof for each lamp, as in Figure 11.

Areas of hue can be moved about within the display area by means of apertured masks, instances 28, 62, 64, 66, 64 of which are seen in Figures 1, 4, 5, 7 and 8, provided that the mask moves differentially relative to the lamps which are behind it. For the differential moving, the mask may be a disk of opaque sheet material, as cardboard, or metal, with apertures cut out, or may be transparent, for which the plastic resin known as Lucite, being a methyl methacrylate resin, is suitable when its non-aperture areas have been made opaque by paint or otherwise. This apertured disk may be mounted loosely on the projecting end of shaft 10, like 28 in Figure 1, so that it is free to turn thereon with but little friction against the shaft. A terminal knurled nut 60 holds the mask removably on the shaft, so that one or another mask can be set there when the glass cover is swung open on its hinges, or is otherwise removed. An axial spring 61 holds the mask out against a washer next to the nut. When the shaft 10 rotates, positively driving the spider 11 and lamps, it also rotates the mask, driving through the frictional contacts of shaft, spring and swirling air; and, by making the total of driving friction, less whatever retarding friction exists, such that the mask has an angular speed slightly less than that of the lamps, a desired differential of speed can be attained.

The varying of this differential, automatically or by an operator, introduces another feature for holding attention of people. It is sometimes found difficult to obtain exactly a desired differential of speed, with only the elements thus far described, for sometimes the mask tends to stick on the shaft, and so to acquire a speed equal to that of the spider and lamps; also it is desirable to be able to operate the mask sometimes with a speed exceeding that of the lamps. Means to assure a varying of differential of speed between mask and lamps is had by utilizing the principle of inertia. The cutting off or reducing of the motor's driving current leads to a slowing of the motor shaft, while inertia carries the mask on in the lead of the motor, and a restoration of original driving current after a few seconds makes the lamps lead the mask. This cutting and restoring of current can be done in any suitable way. As an illustration of one way the drawing shows in Figure 5, diagrammatically at 38, a thermal flasher of known type, wherein the heating of a bimetallic strip by the driving current of the motor bends that strip so as to open a switch, thus changing the voltage supplied to the motor, the illustrated change being a cutting in of a reactance which reduces the motor's speed. With the cooling of such a flasher the reactance is cut out, and inertia of the mask lets the lamps move ahead while the speed of shaft 10 is being accelerated. Inertia in this way keeps the effect of the mask on the display varying in an interesting manner.

However, the differential may be made approximately uniform in a rather positive way, and can be controlled by providing a propulsion jet and a brake. The lamp tubes 22, 24, 26 constitute vanes in the space between the mask and the opaque back 14, and other vanes could be added if wanted, to drive air centrifugally, so that, through an outlet 74 at the peripheral region, the tube 76 and nozzle 70 can project air through the spider and against vanes 72 suitably located on the mask at a middle distance from the axis. As the velocity of this air results from pressure generated centrifugally, it can boost the speed of the mask. The strength of blast through the nozzle can be regulated by a valve 84, whose degree of opening is controlled either locally, as by a hand lever 88, or from a remote point through a switch in circuit 86 operating a solenoid 85 for pulling it open against a spring, to an adjustable limit. The speed of the mask can be held down to whatever may be desired by a brake pad 78, pulled toward the rotating mask by spring 79 and adjustably restrained by thumb screw 80. This pad is on a lever 81 and can be thrown off the mask by a solenoid 83 in circuit 82 operated remotely, if desired, by a control key in that circuit.

By these or by any other suitable means the mask can be caused to rotate differentially with respect to the lamps, with the result that the apertures of the mask gradually gain or lose on the lamps while all are rapidly rotating; and by this means the shapes and locations of apertures may produce a continual state, of genesis, movement, change of shape, and disappearance of color masses, coupled with changes of hue.

Figure 4:
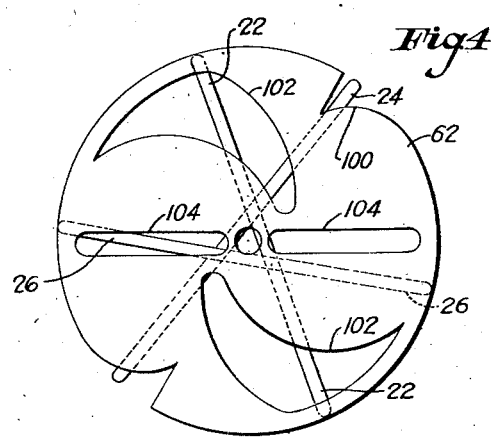
Figure 4 is a face view of one style of apertured mask for making a continuity of changing patterns of colored light from the lamps shown behind it.

For example, considering Figure 4—and assuming the mask 62 and lamps 22, 24, 26 to be rotating anti-clockwise, with the mask moving a little more slowly than the lamps and therefore, relative to the lamps, rotating slowly clockwise—the tip end of the lamp 24, at the instant portrayed, is leaving a peripheral trail of its pure color at the extreme rim; but this will disappear as soon as the notch aperture 100 falls behind the lamp; and after an interval the pure color 26 will appear at the periphery; will broaden inward a little; will change hue there, as it becomes mixed with another; and will suddenly disappear. Meanwhile the portion of lamp 24 which is exposed through the oblique crescent aperture 102 leaves a trail of its pure color near the axis. This broadens and shifts outward; the color 22 moves outward ahead of it; these two become marginally mixed, by radial overlapping of their trails made through the same aperture 102. For the non-radially-lapped part of the color trail of the leading lamp seen through aperture 102, as 22, a mixing with the next color 24 dawns near the rim while that next color 24 is passing the notch 100 at the periphery; and later a brief quick broad mixing with 26, the color next beyond, occurs as that 26 passes the long right hand radial aperture 104, after which the purity of color 22 is resumed from this part of the light of lamp 22, both 24 and 26 being temporarily obscured. Meanwhile, the left hand part of lamp 26 has begun to show near the centre through the left aperture 104; has grown rapidly outward into a full broad band, the outer part of which became mixed with 22; and has then disappeared on leaving the radial slot 104. This analysis is not a complete description of the display effect. It is intended merely to indicate the nature, and the complexity, of the changes of color hues which are continually occurring, with some suggestion of their differing manners of change, and of the movements of hues within the area of the disk.

Figure 7:
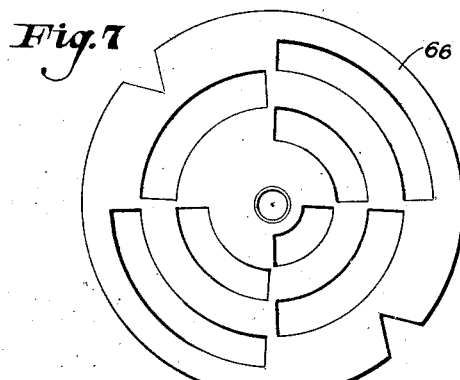
Figures 7 and 8 are face views of other styles of apertured masks, for producing displays having other characteristics.
Figure 8:
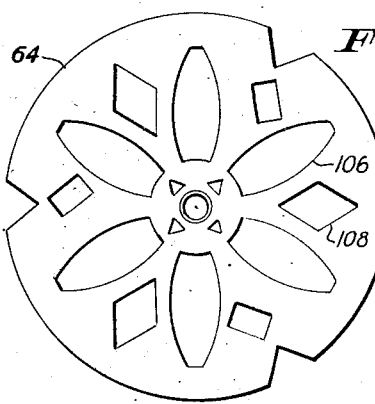

The aperture-shapes which can be made in masks, with interesting effect, are innumerable; but three types can be recognized among those here shown, viz, the color cams, 100 and 102, whose spiral edges move the circular edge of a color trail in or out in the display; the radial apertures 104, 106, 108 which make a broad short-lived exposure of a single color; and the arc-form apertures of Figure 7. From the radial apertures a broad band of color appears rather quickly. The suddenness can be tempered by making the edges bowed as in Figure 8 at 106, or by providing a cross slant, as seen in the relation of lamp to aperture at the left aperture 104 in Figure 4. An aspect of symmetry is had when such a mask as that in Figure 8 is used. All of the lamp colors can be mixed at each principal radial exposure, if all register with the apertures at the same time; or each can be featured separately in turn, if the apertures be made to have a number and spacing not registering with all of the lamps at once. The angular spacing of the apertures around the circle should be such that, at the speed at which the apparatus is to be operated, the trail from each will reach to the next aperture of equal radius. If the circular orbits of apertures adjoin each other the entire area of the disk will be lighted. By obscuring all of the tubes at some particular radial position as by painting, or by the lamp-holding clamps 102 seen in Figure 2, a circle of black is introduced, while by blacking all but one a circle of the pure color of that one will result, subject of course to the effect of whatever mask is used.

The substantial distance at which the mask is set in front of the lamps in Figure 1 contributes to the production of another type of display effect, when a mask is used in which radial apertures predominate, as in the mask 64 of Figure 8. By looking at the display obliquely the boundary of the visible pattern becomes an eccentric lobe, and thus may move about in the display area. The lobular effect is eliminated by use of a mask with arc-form apertures as in Figure 7. And, with any type of mask, an aspect of full coverage of the display area can be had, through a wide angle of oblique view, by setting the mask in a plane close to the plane of the rotating lamps.

Figure 9:
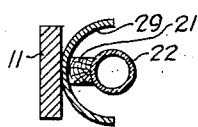
Figure 9 is a cross section on 9—9 of Figure 1 through a lamp and an arm of the spider by which it is held on the shaft.

With the setting shown in Figure 1 the angle of effective display can be widened by setting a half round mirror 29 behind each lamp, as seen in Figures 1 and 9, the tube 22 being mounted in the midst of the mirror on a strip of wood 21 or other insulation.

The setting of motor speed so as to show the dark intervals of the lamps stroboscopically as slowly turning spokes of a wheel makes a display in which the brilliant radial striae and the semi-dark valleys then produced by the condenser combine with distinctive effect, particularly when one or more of the lamps are in a condenser system and one or more are not, and an apertured mask is used, and the striated colors are moved about and played up intermittently among those colors which are not in a condenser circuit.

Figure 6:
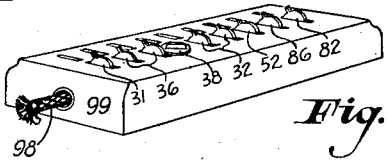
Figure 6 is a perspective of a key board, being a panel of switches, for controlling operation of the display.

The condenser 51 can be continuously connected, as in Figure 1; or it can be arranged to be connected at will of the operator by a relay switch 53 in a circuit 52 having a control switch at any convenient place, as in the control panel 99, Figure 6.

All of the various devices thus described, or such of them as the operator may choose to put into action, make contributions which coact in the producing of the display; and one important feature is that the operator is provided with means to change the combination. The wires indicated in the lower part of Figure 5, below the break shown at 97, can all be combined into a cable 98 leading to a portable panel 99 at any distance, containing the switches, as indicated in Figure 6. By this means a person can unobtrusively make changes in the type of display.

Other circuits, controlling other ways to make changes in the display, can be similarly brought to and controlled by switches in the panel; and among them may be means, manual or automatic, for switching on and off the lamp 13 for lighting the advertising message. Also other control methods for changing the motor speed can be substituted for the thermal flasher 38, which is to be taken as representing any of the many known types of devices for motor speed change. Likewise other means may be used for controlling the speed of the mask. When the cover glass 20 is omitted, escape of air from the back side of the mask, and drag of air on the front, especially if there are vanes on the face of the mask, reduce the propulsion so that a differential of speed from that of the lamps always arises.

The facial drag is produced either by adding facial vanes (not shown) or by installing the mask other side out, in which case the vanes 72 are outside.

The current may be introduced to the lamps mounted on the rotating shaft by any suitable means. For this purpose Figures 1 and 5 show insulated rings 41 against which brushes 42 press. Wires 44 indicate the circuit leading through the three lamps in series, as seen more clearly in Figure 10. The condenser circuit is marked 43, being a circuit from the left hand brush 42, Figure 5, through the tube 22 and back to the middle brush. In this condenser circuit is a switch 52', indicated as being operated by a relay 53 which has a circuit 52 running to a distance, as to the panel 99 of Figure 6, where a switch in circuit 52 can put the condenser 51 into or out of connection with the tube 22 while the other tubes 24, 26 remain outside of the circuit through which the condenser discharges, although their color display is influenced by it.

Figure 11 shows an arrangement to which individual control can be applied for tubes having different operating voltages. The lamp tubes are set in parallel, across circuit 34, each having its own transformer 40' the current from which passes to its particular tube through slip rings 41' on a motor shaft 10' on which the tubes may be mounted and rotated. In this case attention-challenging differential striae patterns are obtainable, by setting a plurality of condensers (not shown in Figure 11) so that the delay caused by one in the lighting of the tube to which it is connected is different from the delay in the lighting of another tube, caused by the condenser which is applied to that other tube.

A high speed of rotation can be safely had, without glass breakage, and without special problems of anchoring the glass, if the illustrated arrangement of tubes is used wherein each tube is rectilinearly continuous across the central region without any important lateral peripheral portion to which the centrifugal force applies transversely of the tubes as a breaking stress. The centrifugal force at each end is transmitted longitudinally of the tube and is absorbed in the glass itself by balance of equal and opposite tension at the other end.

The centrifugal propulsion of air made by the tubes, which themselves act as vanes, is an element in the driving of the mask by friction of air against it. In case the tube 76 is not used, the propelling effect of whirling air can be modified and controlled by regulating the size of opening for its escape from behind the mask at the periphery. There will ordinarily be open space around the shaft, and some leakage at the periphery, so that this flow of air will keep down the temperature in the space where the lamps are.

I claim as my invention:

1. In apparatus for luminous display, having a rotating shaft and elongated tubular gas-electric colored lamps carried thereby in succession through an orbit, that improvement in which individual lamps of successively differing colors are set at substantial angular spaces apart around the orbit, and have their tubes severally continuous across the central region of rotation and across each other into opposite parts of the orbit.

2. Luminous display apparatus as in claim 1, further characterized in that the tubes cross the shaft and cross each other at locations beside the periphery of the shaft.

3. Luminous display apparatus as in claim 1, further characterized in that the tubes cross the shaft and cross each other close by the periphery of the shaft, each tube's crossing of the shaft being on a side thereof different from where the other tubes cross the shaft.

4. Luminous display apparatus as in claim 1, further characterized in that the main luminous parts of the crossed tubes are set approximately in a plane perpendicular to the axis of the shaft, and that in crossing the central region each tube passes beside the shaft and curves out of said plane to cross one only of the other tubes.

5. Luminous display apparatus as in claim 1, wherein the luminous display portion of each tube is rectilinear from near the centre to near the periphery and each display portion in the succession around the shaft, is of different color from the display portion which precedes it.

6. In apparatus for luminous display, having a rotating shaft and elongated tubular gas-electric colored lamps carried thereby in succession through an orbit, that improvement in which individual lamps of successively differing colors each have a plurality of luminous portions in the display orbit, set at different angular positions relative to each other around the shaft, each such lamp having a tubular portion which approaches the centre from the periphery of the display and thence recedes toward the periphery at an opposite part of the orbit, the angular position of each said luminous portion being near enough, to the angular position of a lamp of another color, for the colors of these two to mix by persistence of vision when the lamps are rotated through the orbit.

7. In apparatus for luminous display, having a rotating shaft carrying gas-electric lamps of differing colors in succession through an orbit, there being a transformer in the means for lighting the lamps; that improvement which provides arrangement of the lamps all facing in a single direction, with conductors connected to the lighting means simultaneously, and provides means to alter the color display, comprising a plurality of variant circuits in the means for lighting one or more of the lamps, said circuits including means for producing operating voltages therefor which are diverse in character; the said lamps being in series, and there being a shunt past one lamp of that series to a lamp later in that series; said shunt containing a condenser; and switch means for selectively connecting one or another of said circuits to the said lamp or lamps whereby the visual effect of the rotating lamps is varied, by varying the colors in the resulting mixture.

8. In apparatus for luminous display, having a rotating shaft carrying gas-electric lamps of differing colors in succession through an orbit, there being a transformer at the display apparatus in the means for lighting the lamps; that improvement which provides arrangement of the lamps all facing in a single direction, with conductors connected to the lighting means simultaneously, and provides means to alter the color display, comprising a plurality of variant primary circuits of the transformer in the means for lighting one or more of the lamps, including means for producing operating voltages therefor which are diverse in character; and switch means for selectively connecting one or another of said circuits to the said lamp or lamps comprising one or more loops of primary circuit extending to a distance from the display apparatus and there having the said switch means.

9. Luminous display apparatus as in claim 8, in which one of the said diverse operating voltages applied to one or more of the lamps is at the flicker point thereof.

10. Luminous display apparatus as in claim 8, wherein one of the said variant circuits has a condenser connected across one or more of the lamps, having capacity for oscillating discharge while the main operating voltage of the lamp is being applied.

11. Luminous display apparatus as in claim 8, wherein one of the said variant circuits has a condenser connected across one or more of the lamps, having capacity for oscillating discharge while the main operating voltage of the lamp is being applied; there being a switch in the condenser circuit; a relay to operate that switch; and a circuit for operating the relay, having a control switch at a distance from the apparatus.

12. A luminous display apparatus as in claim 8, having a plurality of electrical devices for varying the voltages effecting the luminous discharges of the lamps; a control panel; wires assembled together and comprising circuits for controlling said devices, leading to a distance from the apparatus, to said panel; and switches with operating keys, assembled together in the panel, for controlling said devices for diversifying said display.

13. In apparatus for luminous display, having a rotating shaft carrying gas-electric lamps of differing colors in succession through an orbit, there being a transformer in the means for lighting the lamps; that improvement in which a condenser is connected in shunt across one or more of the lamps, having capacity for oscillating discharge while the main operating voltage of that lamp is being applied, thereby making a display of striae in the color trail left by the lamp.

14. Luminous display apparatus as in claim 13, wherein one or more of the display lamps is outside of the circuit of the said discharging condenser.

15. In apparatus for luminous display, having a rotating shaft and tubular gas-electric colored lamps carried thereby in succession through an orbit, that improvement in which an apertured mask overlies the area of the orbit of the lamp, its apertures being adapted in shape and location for displaying parts of the luminous lamp surfaces while parts of those surfaces are obscured by the mask; said mask being mounted on and rotatable with respect to said shaft; there being frictional means whereby the shaft drives the mask rotatively.

16. Apparatus for luminous display as in claim 15 wherein there is also means, other than friction in the mounting, for boosting the speed of the mask relative to the shaft.

17. Apparatus for luminous display as in claim 15 wherein vanes are on the shaft and the mask is so close to those vanes that the air whirled thereby propels the mask.

18. Apparatus for luminous display as in claim 15, wherein also there is a closure, retarding escape of air from between the whirling lamps and the mask; an air outlet at the periphery; vanes on the mask; and a guide passage directing centrifugal air from the outlet against the vanes on the mask.

19. Apparatus for luminous display as in claim 15, further characterized in that there is closure means by which escape of whirled air is retarded; a passage, back of the whirling lamps, conducting centrifugal air from periphery toward shaft and discharging it toward the mask; there being vanes on the mask; and there being a spider holding the lamps, between whose arms the air reaches said vanes.

20. Apparatus for luminous display as in claim 15, wherein there is also means applying friction to the mask for retarding its speed.

21. Apparatus for luminous display as in claim 15, wherein there is also a brake operating on an edge portion of the mask.

22. Apparatus for luminous display as in claim 15, wherein there is also, in the apparatus at the place of display, speed controlling means for the mask; and an electrical circuit for operating said speed controlling means, having a loop to a remote place, and there having a control switch.

23. Apparatus for luminous display as in claim 15 wherein there is also a vent for centrifugally pressed air; and a control valve therein, whereby the flow of air propelling the mask may be regulated.

24. In apparatus for luminous display having a rotating shaft carrying color lamps having diverse colors arranged in succession for rotative disk-form display, that improvement wherein the lamps, being tubular and being arranged approximately rectilinearly from the central region to the peripheral region, are combined with a disk mask having approximately radial apertures, the apertures having edges which are at slight angles to the directions in which the lamps behind them extend.

RALPH P. NEWHALL.